United States Patent [19]
Hong

[11] Patent Number: 5,754,691
[45] Date of Patent: May 19, 1998

[54] NORMALIZATION OF DATA FROM HOLOGRAPHIC CORRELATORS

[75] Inventor: John H. Hong, Thousand Oaks, Calif.

[73] Assignee: Rockwell International Corporation, Costa Mesa, Calif.

[21] Appl. No.: 557,890

[22] Filed: Nov. 14, 1995

[51] Int. Cl.$^6$ ................. G06K 9/76; G03H 1/16
[52] U.S. Cl. ............. 382/210; 382/218; 382/219; 359/29; 359/32; 359/561; 358/480
[58] Field of Search .................. 382/210, 209, 382/211, 218, 219, 220, 280, 254, 305; 359/561, 29, 558, 559, 22, 23, 25, 31, 32, 35; 365/124, 125; 358/480, 463; G06K 9/76

[56] References Cited

U.S. PATENT DOCUMENTS

| | | | |
|---|---|---|---|
| 4,958,376 | 9/1990 | Leib | 382/31 |
| 5,309,523 | 5/1994 | Iwaki et al. | 382/210 |
| 5,339,305 | 8/1994 | Curtis et al. | 369/112 |
| 5,347,375 | 9/1994 | Saito et al. | 382/210 |
| 5,416,616 | 5/1995 | Jenkins et al. | 359/11 |
| 5,440,669 | 8/1995 | Rakuljic et al. | 359/7 |
| 5,483,365 | 1/1996 | Pu et al. | 359/11 |
| 5,606,435 | 2/1997 | Kransteuber | 359/29 |
| 5,619,596 | 4/1997 | Iwaki et al. | 382/210 |

OTHER PUBLICATIONS

Hong et al., "Volume holographic memory systems: techniques and architectures," *Optical Engineering*, vol. 34, No. 8, pp. 2193–2203 (Aug. 1995).

Hong et al., "Optical pattern clasifier with Perceptron learning," *Applied Optics*, vol. 29, No. 20, pp. 3019–3025 (10 Jul. 1990).

*Primary Examiner*—Kim Yen Vu
*Assistant Examiner*—Madeleine Av Nguyen

[57] ABSTRACT

A method is provided for normalizing correlation data from a holographic correlator. After a sequence of object image patterns are recorded in an angularly multiplexed hologram, the entire volume hologram contents are read out with a uniform (plane wave) object beam. The plane wave readout produces an array of spots at a correlation plane, with the intensity of each spot representing the strength of the recorded hologram for the corresponding stored image pattern. The spot intensity values are accurately detected and stored as normalization factors. Holographic correlation output array values produced by parallel comparison of an input object pattern with the stored image patterns are then divided by the corresponding normalization factors. The resulting normalized correlation output accurately represents the true degree of correlation between the input object pattern and the stored image patterns by eliminating the uncertainty factor. The method generates accurate correlation values from a volume holographic correlator while maintaining high effective computational rates.

13 Claims, 1 Drawing Sheet

NORMALIZATION OF DATA FROM HOLOGRAPHIC CORRELATORS

TECHNICAL FIELD

The present invention relates to holography and, in particular, to a method of normalizing correlation data from a holographic correlator.

BACKGROUND OF THE INVENTION

An increasingly important task for many information processing systems is comparing or correlating an image or pattern (such as a fingerprint, for example) with a large library of stored image patterns to determine the best match. Conventional pattern recognition systems use a sequential approach in which an input pattern is compared with one stored pattern at a time. The correlation rate for sequential comparison is limited by the time required to retrieve a particular pattern from memory and the overall correlation process itself. This technique currently precludes real-time operation with a library larger than a few tens of stored patterns. An alternative approach is the use of holographic media (such as photorefractive crystals, for example) for storing a library of images as angularly multiplexed holograms. Volume holographic correlators are known to have the capability of comparing an input pattern against an entire library of stored holograms simultaneously for pattern matching and retrieval, thus achieving extremely high computational rates through parallelism. Further background information on holographic memories can be found in Hong et al., "Volume holographic memory systems: techniques and architectures," *Optical Engineering*, Vol. 34, No. 8, pp. 2193–2203 (August 1995), the teachings of which are incorporated herein by reference.

An undesirable characteristic of volume holographic memories, however, is that the stored holograms have non-uniformities resulting from factors such as material imperfections and conditions that are difficult to control during the image recording process. When attempting to match patterns, nonuniformities existing in stored holograms can produce inaccurate correlation values and excessive "false alarm" rates. Thus, there is a need for a system of holographic correlation that generates accurate correlation values while maintaining high computational rates.

SUMMARY OF THE INVENTION

The present invention comprises a method of normalizing correlation data from a volume holographic correlator. As is known in the art, holographic recording can be accomplished by interaction of object beams with plane wave reference beams to form gratings that store a sequence of images or patterns in an angularly multiplexed hologram. In the present method, the contents of the entire volume hologram are read out with a uniform (plane wave) beam at the object beam port. This readout reconstructs the reference beams and generates an array of spots at the correlation plane, with the intensity of each spot representing the strength of the grating produced (recorded) with the corresponding reference beam. The spot intensity values are accurately detected and stored for use as normalization factors. Holographic correlation output array values, generated by parallel comparison of an input object pattern with the stored image patterns, are then divided by the corresponding normalization factors. The resulting normalized output accurately represents the true degree of correlation between the input object pattern and the stored image patterns.

A principal object of the invention is generation of accurate correlation values from volume holographic correlators. A feature of the invention is a normalization factor generated for each spot of a holographic correlator output array. An advantage of the invention is generation of accurate holographic correlation values while maintaining high effective computational rates.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Volume holographic correlation has the potential for achieving great improvements in computer assisted pattern recognition. A volume holographic memory can be used to store a library of image patterns (up to thousands of images, for example). A given input object pattern can then be compared simultaneously (in parallel) with the entire library of stored image patterns. The correlation system retrieves the stored image pattern that most closely resembles the input object pattern. If the system performs this function in the time of one millisecond, with a library of 1,000 stored patterns each comprising an image of 512 by 512 pixels, for example, the equivalent computational rate achieved is on the order of 250 billion operations per second.

In an experimental demonstration of a volume holographic correlator, 5000 fingerprints obtained from published FBI data were stored as a library of angularly multiplexed holograms in a one cubic centimeter photorefractive crystal (comprising $LiNbO_3$). The holograms were exposed sequentially, with the exposure times following a prescribed schedule to produce uniform amplitude gratings. When the holograms were read out with an input object pattern, an array of spots was generated almost instantaneously, with the intensity of each spot encoding the degree of correlation between a corresponding stored pattern and the input object pattern. By simply identifying the spot in the array with the highest intensity, the system determines the particular stored image pattern that most closely matches the input object pattern. An important aspect of holographic correlation is that the speed of comparison remains essentially the same regardless of the size of the reference library stored in the holographic medium. This inherent parallelism of holographic correlators is not possible with conventional sequential comparison schemes. Furthermore, the images that can be stored and retrieved in a holographic correlator are not limited to fingerprints or other two dimensional patterns. When used in conjunction with existing computing systems, holographic correlators can provide solutions to problems in machine vision, pattern recognition, speech recognition, and smart memory access.

Before practical holographic correlation systems can be implemented, however, there are certain technical difficulties that must be solved. One major problem is the inherent nonuniformity in the strengths of the individual holograms that are recorded in the holographic medium. Such nonuniformities can arise from material imperfections and from variations in the exposure-to-exposure sequence of recordings needed to build the library of stored image patterns in the composite hologram.

Figure 1:
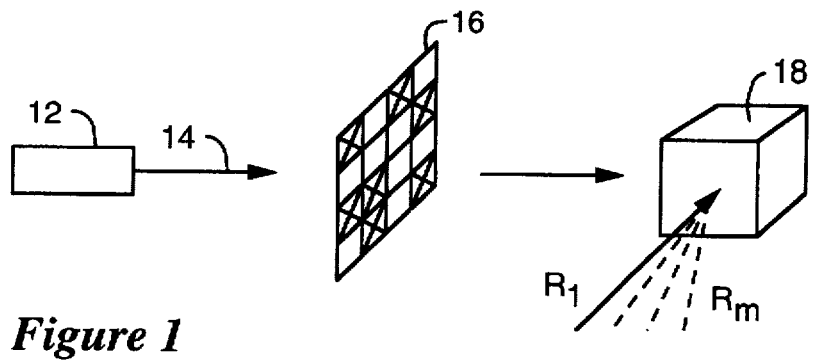
FIG. 1 is a simplified schematic diagram illustrating the recordation of angularly multiplexed image patterns in a volume holographic medium.
Figure 2:
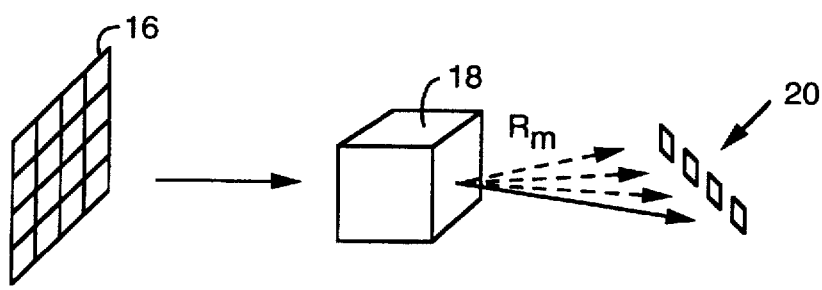
FIG. 2 is a simplified schematic diagram illustrating a plane wave object beam used to generate normalization factors for the stored patterns in the holographic medium of FIG. 1.
Figure 3:
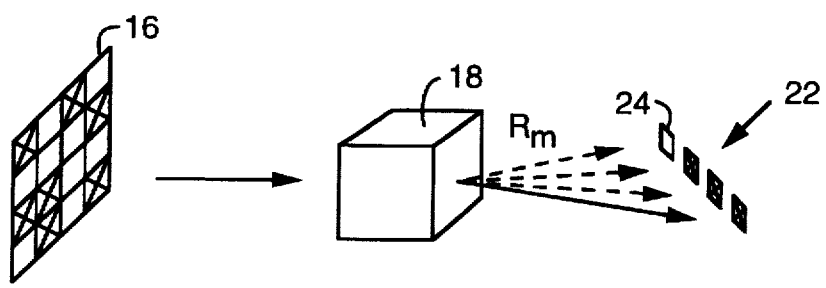
FIG. 3 is a simplified schematic diagram illustrating correlation of an object pattern with image patterns stored in the holographic medium of FIG. 1.

As shown in the simplified schematic diagram of FIG. 1, a beam 14 from a source 12 (generally a laser) carries an object image, typically generated by a spatial light modulator (SLM) 16, that interacts with a plane wave reference beam $R_m$ to form gratings in a volume holographic medium 18 (such as a photorefractive crystal, for example). FIGS. 1-3 are simplified by omitting commonly understood optical elements such as lenses, mirrors, beam splitters, et cetera. For example, reference beams $R_m$ are generally derived from beam 14 using a beam splitter. As is known in the art, a set of angularly multiplexed image patterns $g_m(x)$ can be recorded in holographic medium 16, wherein each object image $g_m(x)$ is recorded using a unique, angularly offset plane wave reference beam $R_m$. The holograms are generally recorded at the Fourier transform plane, so that Fourier transforms of $g_m(x)$ are recorded (linear transforms other than Fourier transforms may also be used, however). With $G_m(x')$ representing the linear transform of $g_m(x)$, and * denoting a complex conjugate, the hologram amplitude $H(x')$ after M exposures (one exposure for each stored image pattern) is given by:

$$H(x')=\Sigma \alpha_m \, G^*_m(x') \, e^{i(2\pi/\lambda F)x_m \cdot x'} + \text{complex conjugate},$$

where $x_m$ represents the positions at which each corresponding reference wave (either the original reference wave during recording or the reconstructed reference wave during readout) comes to a focus at the output correlation plane. The $m^{th}$ multiplier $\alpha_m$ represents the variation or uncertainty of the strength of each hologram component. For convenience, the focal length of each lens is given by F, although different values can be used to change the spatial scale of the correlation plane. When the prepared hologram is interrogated with an object beam that contains an unknown pattern, such as $g(x)$ having transform $G(x)$, to be compared against the recorded library of stored image patterns, an array of M correlation spots appears at the output correlation plane with the $m^{th}$ spot having an amplitude $c_m$ given by:

$$c_m = \alpha_m \int G(x') G^*_m(x') \, dx' = \alpha_m \int g(x) \, g^*_m(x) \, dx,$$

which is the correlation integral of the input pattern $g(x)$ with the $m^{th}$ stored image pattern $g_m(x)$. Errors in the correlation are induced in direct proportion to the uncertainty factor $\alpha_m$, which results from conditions, such as material imperfections, that are difficult or impossible to control during the image recording process. The present method, as explained below, reduces or eliminates these errors.

The present method of normalizing correlation data requires no change in commonly used holographic apparatus and no need for complex software corrections. Before using the library of recorded holograms to perform a correlation, an object beam with all pixels set to unity (plane wave), as illustrated in FIG. 2 with all pixels of SLM 16 in the on state, is used to read out the stored holograms. This reconstructs the reference beams $R_m$ as an output array of M correlation spots 20. The $m^{th}$ correlation spot that is formed in such a procedure has an amplitude given by:

$$c'_m = \alpha_m \int g^*_m(x) \, dx.$$

Dividing the raw output with the normalizing factor gives the processed result:

$$\frac{c_m}{c'_m} = \frac{\int g(x) g^*_m(x) dx}{\int g^*_m(x) dx}.$$

The uncertainty factors $\alpha_m$ are thus canceled and the result is a true correlation of the input against the array of reference patterns. These results comprise normalization factors (one each) for the M correlation spots 20. The normalization factors $c'_m$ can be stored in a local memory and used to normalize every subsequent correlation result by dividing each output array value by the corresponding normalization factor.

In operation of the holographic correlator, as shown in FIG. 3, an object image (as provided by SLM 16) is input to holographic medium 18 for correlation with the library of previously stored image patterns. This produces a raw output array of correlation spots 22 (corresponding to reference beams $R_m$) whose intensities include the uncertainty factor $\alpha_m$. The raw values are then divided by the corresponding normalization factors, which were generated and stored as described above. This normalization step effectively removes the uncertainty factor $\alpha_m$ from the correlation results to yield an accurate correlation amplitude. The best match for the object image is identified in output array 22 by the correlation spot 24 having the highest intensity after normalization.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A method of generating normalization factors for a holographic correlator, comprising the steps of:

directing a uniform object beam into a holographic medium to read out an angularly multiplexed hologram stored in the medium;

detecting a normalizing output array corresponding to correlation between the uniform object beam and the stored hologram;

determining the amplitude of each value in the normalizing output array and using the amplitude values to remove the uncertainty factor from an image output array corresponding to correlation between an object beam containing an image and the stored hologram.

2. The method of claim 1, wherein said step of detecting a normalizing output array comprises reconstructing reference beams used to form the stored hologram.

3. The method of claim 2, wherein said step of determining the amplitude of each value in the normalizing output array comprises measuring the amplitudes of the reconstructed reference beams, wherein the reference beam amplitudes correspond to the strengths of gratings formed in the holographic medium.

4. The method of claim 3, wherein said step of using the amplitude values comprises dividing the image output array by the amplitude values.

5. A method of normalizing correlation data from a holographic medium containing a plurality of image patterns stored in an angularly multiplexed hologram, comprising the steps of:

reading out the hologram with a uniform object beam to generate a normalizing output array corresponding to correlation between the uniform object beam and the stored hologram;

directing an input object pattern into the holographic medium;

generating a correlation array by parallel comparison of the input object pattern with the plurality of stored image patterns; and normalizing the correlation array by dividing the array by the normalizing output array.

6. The method of claim 5, further comprising the step of determining the amplitude of each value in the normalizing output array.

7. The method of claim 6, wherein the step of determining the amplitude of each value further comprises reconstructing reference beams used to form the stored hologram.

8. The method of claim 7, wherein said step of determining the amplitude values comprises measuring the amplitudes of the reconstructed reference beams, wherein the reference beam amplitudes correspond to the strengths of gratings formed in the holographic medium.

9. A method of holographic correlation, comprising the steps of:

storing a plurality of image patterns in a volume holographic medium as an angularly multiplexed hologram;

reading out the hologram with a uniform object beam to generate a normalizing output array corresponding to correlation between the uniform object beam and the stored hologram;

determining the amplitude of each value in the normalizing output array;

directing an input object pattern into the holographic medium;

generating a correlation array by parallel comparison of the input object pattern with the plurality of stored image patterns; and normalizing the correlation array by dividing the array by the normalizing output array.

10. The method of claim 9, wherein said step of storing the plurality of image patterns comprises forming a grating in the holographic medium by interaction of an object beam with a corresponding reference beam for each image pattern.

11. The method of claim 10, wherein said step of reading out the hologram comprises reconstructing the reference beams used to form the stored image patterns.

12. The method of claim 11, wherein said step of determining the amplitude values comprises measuring the amplitudes of the reconstructed reference beams, wherein the reference beam amplitudes correspond to the strengths of the gratings forming the stored image patterns in the holographic medium.

13. The method of claim 12, further comprising the step of determining the best match for the input object pattern with the stored image patterns by comparing the normalized correlation data.

* * * * *